Aug. 25, 1970 R. H. KENNY 3,525,268

PARALLEL SHAFT CAM DRIVE

Filed May 14, 1969 2 Sheets-Sheet 1

Inventor
Ronald H. Kenny
By:
Davis, Lucas, Brewer & Brugman
Attys.

Aug. 25, 1970 — R. H. KENNY — 3,525,268
PARALLEL SHAFT CAM DRIVE
Filed May 14, 1969 — 2 Sheets-Sheet 2

Inventor:
Ronald H. Kenny
By: Davis, Lucas, Brewer & Brugman
Attys.

United States Patent Office 3,525,268
Patented Aug. 25, 1970

1

3,525,268
PARALLEL SHAFT CAM DRIVE
Ronald H. Kenny, Addison, Ill., assignor to Commercial Cam & Machine Company, Chicago, Ill., a corporation of Illinois
Filed May 14, 1969, Ser. No. 824,638
Int. Cl. F16h 27/04
U.S. Cl. 74—84                                                   4 Claims

ABSTRACT OF THE DISCLOSURE

Cam follower wheel having yoke mounting for follower rollers which cooperate with conjugate cam in parallel shaft cam drive to provide maximum accuracy, strength and useful life, while insuring zero-backlash, proper preloading, eliminating vibration during operation and reducing manufacturing costs, including use of investment castings for cam and follower wheel, and improving serviceability by providing casing with separable parts for substantially exposing entire operating mechanism and simplified eccentrically-bored bearing caps for follower wheel shaft adjustable to preload follower rollers and to compensate for wear.

BACKGROUND OF THE INVENTION

Field of the invention

The invention relates generally to precision driving mechanisms, and more particularly to parallel shaft cam drives.

Description of the prior art

The most closely related prior art known is that disclosed in U.S. Letters Patent No. 2,986,949, issued June 6, 1961, of which the present invention is an improvement. That patent discloses an indexing cam structure which employs a conjugate cam, comprising two identical but reversely arranged cam members attached to opposite sides of a drum, mounted on a driving or input shaft, and the mounting on a parallel driven or output shaft of a wheel having cam follower rollers on cantilever shafts alternately extending laterally therefrom. While that structure includes eccentrically-bored shaft bearing caps to effect adjustment of the spacing between the shafts to preload the cam followers and to compensate for wear, in order to accomplish such adjustments it is necessary to completely remove the bearing cap mounting screws. Preloading of the cam followers is essential to assure accuracy of operation of such a device, but along with the stresses imposed during high speed operation, it may result in bending and misalignment of the cantilever shafts supporting the cam follower rollers and in objectionable vibration and wear in such prior art structure.

SUMMARY OF THE INVENTION

This invention eliminates those objections to such prior art structure by providing a novel cam follower wheel which supports both ends of the shafts for the cam follower rollers. It also reduces manufacturing costs by making both the follower wheel and the conjugate cam as unitary investment castings, which minimizes costly machining operations, and improves the serviceability of the device by providing simplified eccentrically-bored shaft bearing caps, which require only loosening of their mounting screws to effect preload and wear-compensating adjustments, and a casing having separable parts so arranged that substantially the entire operating mechanism may readily be exposed.

In addition to being employed in an indexing cam drive such as those of No. 2,986,949, this invention also is applicable for use in continuous speed-reducing or speed-increasing drives, constant or variable velocity drives, and for imparting oscillating movements to the driven shaft, i.e., it permits unlimited programming of the velocity and mode of operation of the driven shaft, the desired specific operation of the driven shaft being determined by the configuration of the cam. The present invention accomplishes these unique results by maintaining proper preloading and distributing the operating stresses uniformly axially of the anti-friction bearings for the cam follower rollers to insure zero-backlash, since any deflection of the follower roller shafts is prevented and running clearances are not necessary, as are required with any type of gears.

A further feature of the invention is that it permits the use of minimum differences between the maximum radius of the cam follower wheel and the radius of the driven shaft by joining the inner parts of the yoke portions of the cam follower wheel by means of axially extending non-cylindrical portions which increase the effective thickness of the wall of the bore of the cam follower wheel at the most critical points.

Figure 2:
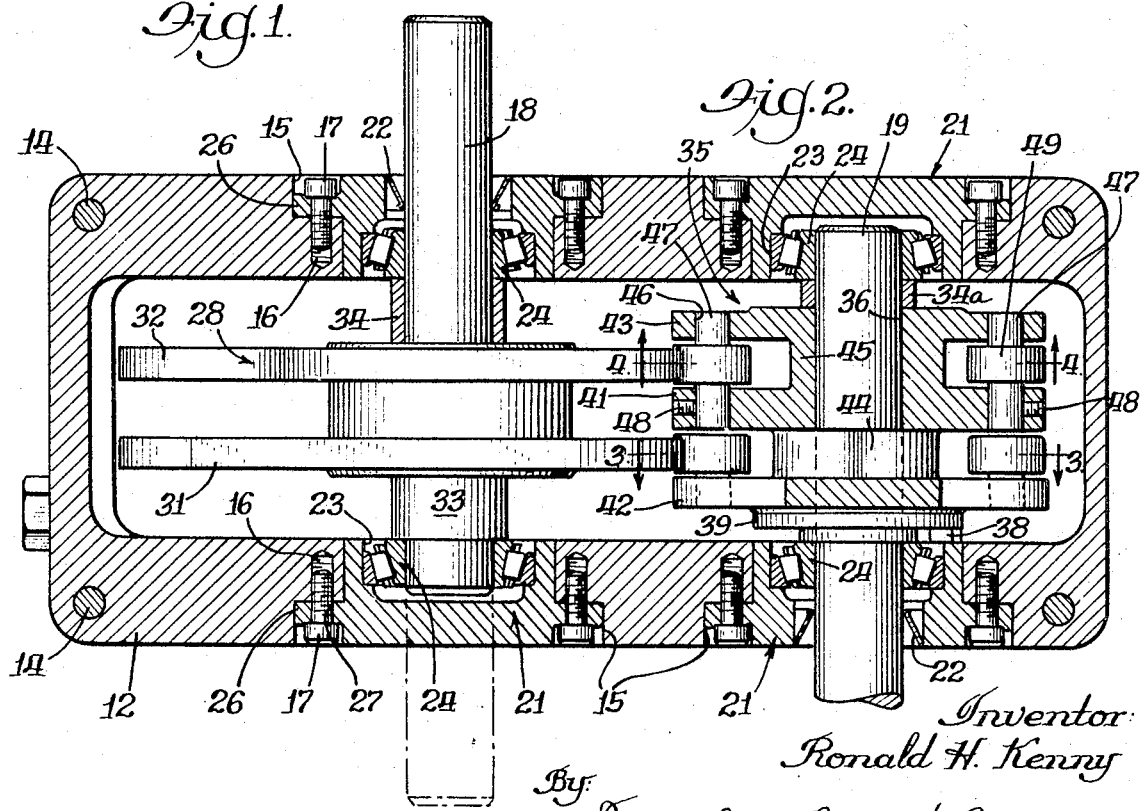
FIG. 2 is a horizontal section taken substantially on the line 2—2 of FIG. 1.
Figure 3:
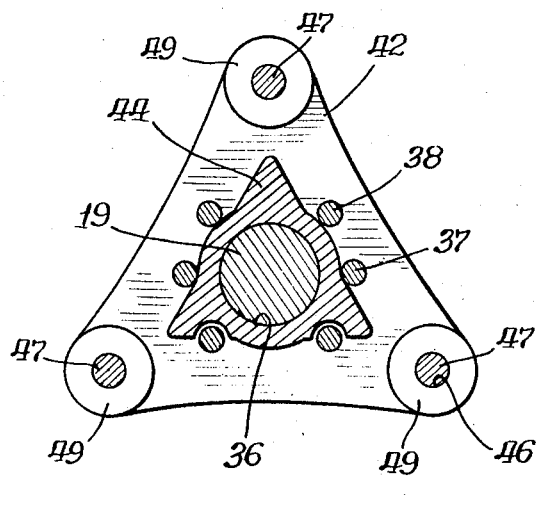
Figure 4:
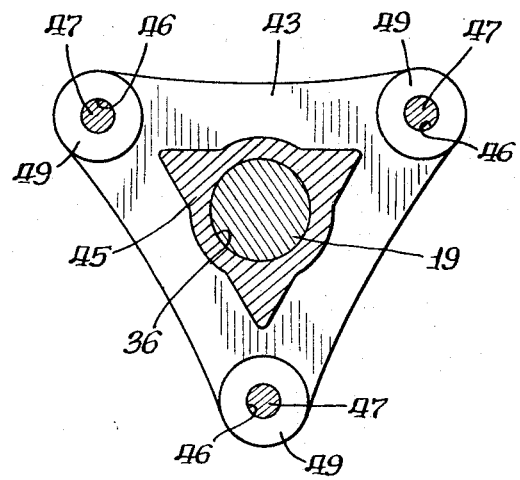
Figure 5:
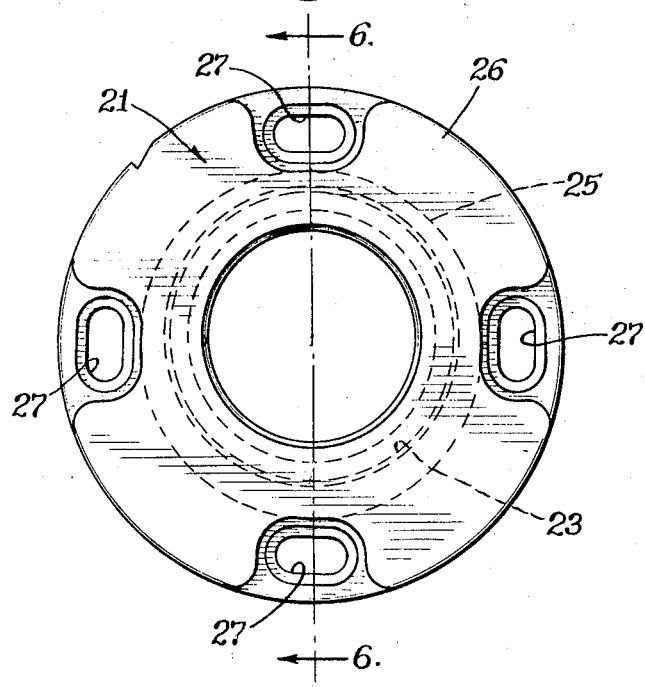

FIGS. 3 and 4 are detail vertical sections taken substantially on the lines 3—3 and 4—4, respectively, of FIG. 2;

FIG. 5 is an enlarged detail side elevation of one of the bearing caps; and

Figure 6:
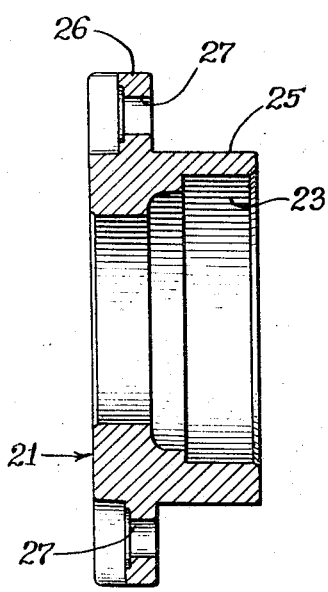

FIG. 6 is a vertical section taken substantially on the line 6—6 of FIG. 5.

DESCRIPTION OF THE PREFERRED EMBODIMENT

Figure 1:
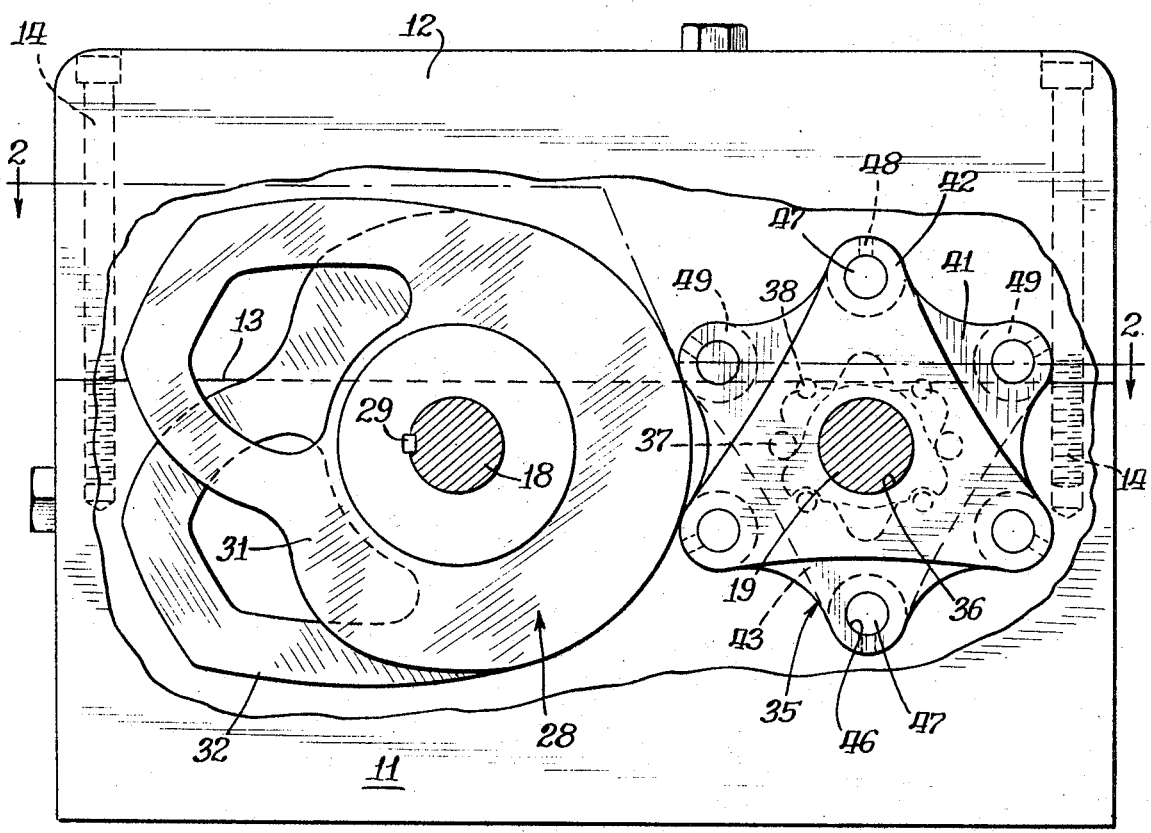
FIG. 1 is a side elevation of an embodiment of the invention, with parts broken away and parts in section to show the operating mechanism.

Referring more particularly to FIGS. 1 and 2, reference numeral 11 indicates a base portion and reference numeral 12 a cover portion joined together along mating surfaces 13 (FIG. 1) by screws 14 (FIG. 2), or the like, and comprising separable parts of a casing housing the operating mechanism of a parallel shaft cam drive embodying the features of this invention. Adjacent their mating surfaces 13, each of the side walls of the casing parts 11, 12 are formed to provide two aligned pairs of circular apertures 15, and four tapped holes are spaced outwardly from and peripherally around each of the apertures 15 in the exterior walls of the casing on the horizontal and vertical axes of the apertures 15, with the uppermost of those holes 16 in the cover part 12 and the others in the base part 11, and each provided with a mounting screw 17.

The aligned pairs of apertures 15 receive input and output shafts 18 and 19, respectively, which may extend through the casing at either or both sides thereof and are journaled therein by means of bearing caps indicated generally by reference numeral 21. Where one end of a shaft 18 or 19 does not protrude from the casing, the associated bearing cap 21 is imperforate, but where the shaft does extend outwardly of the casing, the outer portion of the associated bearing cap 21 is bored to receive a suitable oil seal 22 to prevent leakage of oil from the casing. The inner portion of each bearing cap 21 is provided with a bore 23 (FIGS. 2 and 6) for receiving an anti-friction bearing 24 of well-known construction for the associated shaft 18 or 19, and an outer cylindrical surface 25 slidably fitting into a reduced inner portion of the associated circular aperture 15 in the casing. An outer counterbored or larger portion of each aperture 15 receives a peripheral flange 26 of the associated bearing cap 21 which is provided with four arcuate slots 27 (FIG. 5) extending therethrough equally spaced circumferentially of the cap to register with the tapped holes 16 and receive the screws 17 when the bearing cap is disposed in the associated aperture 15.

In at least one of the aligned pairs of apertures 15, the bearing caps 21 have their bores 23 eccentrically disposed relative to their outer cylindrical surfaces 25, whereby the center lines of the parallel shafts 18 and 19 may be adjusted toward or away from each other merely by loosening the mounting screws 17, incrementally rotating the caps 21 in their apertures 15, and again tightening the screws 17 for effecting preloading and compensation for wear. Such eccentricity of the bore 23 relative to the outer cylindrical surface 25 and flange 26 is best illustrated in FIGS. 5 and 6. It also will be appreciated that substantially the entire interior of the casing and the operating mechanism therein (to be described hereafter) may readily be exposed merely by removing the four upper bearing cap mounting screws 17 and the screws 14, which normally secure the separable parts 11 and 12 together, and lifting off the cover portion 12.

As best seen in FIGS. 1 and 2, a conjugate cam, generally indicated by reference numeral 28, is mounted on the input shaft 18 within the casing 11, 12 and is secured thereto for rotation therewith in any suitable manner, as by means of a key 29 (FIG. 1). This cam is formed with peripheral portions 31 and 32 displaced axially of the shaft 18 relative to each other and preferably as a unitary investment casting. In the embodiment of the invention herein illustrated, these peripheral portions 31 and 32 are of identical configuration transversely of their axis of rotation (shaft 18) but are displaced angularly thereof relative to each other for the purpose of imparting intermittent or indexing rotation to the output shaft 19 in a manner similar to that of the indexing cam structure of No. 2,986,949. It will be understood by one skilled in the art, however, that by providing different configurations for the peripheral portions 31, 32 than those herein illustrated, unlimited programming of the velocity and mode of operation of the output shaft 19 by the cam 28 is available, including imparting thereto continuous and constant speed-reducing or speed-increasing rotation, or oscillating movements, as desired. The cam 28 is positioned within the casing between a shoulder or flange 33 on the shaft 18 and a spacer sleeve 34 on the shaft between the cam and the adjacent anti-friction bearing 24.

The means for transmitting rotation of the input shaft 18 and the cam 28 and transforming it into the desired operation of the output or driven shaft 19 in the embodiment of the invention herein illustrated comprises a cam follower wheel, indicated generally by reference numeral 35, having a bore 36 for receiving the output shaft 19. The wheel 35 is secured and properly positioned with respect to the shaft 19 by means of dowels 37 and screws 38 (FIG. 3) connecting the wheel to a flange 39 (FIG. 2) on a shoulder formed integrally with the shaft. The cam follower wheel 35 is properly positioned laterally within the casing relative to the cam 28 by means of the shoulder on the shaft 19 carrying the flange 39 abutting the adjacent anti-friction bearing 24 on one side of the casing and a spacer sleeve 34a on the shaft between the wheel and the anti-friction bearing 24 at the other side.

The cam follower wheel 35 comprises a central flange 41 and side flanges 42 and 43 spaced at opposite sides thereof axially of the bore 36 and joined thereto, respectively, by noncylindrical hub portions 44 and 45. As best seen in FIGS. 1, 3, and 4, these side flanges 42 and 43 are substantially triangular in transverse outline, with the vertices of one circumferentially offset from those of the other sixty degrees. Thus, the vertex of each side flange 42 and 43 forms, along with the adjacent part of the non-cylindrical hub portion 44 and 45, respectively, and the central flanges 41, a yoke portion (FIG. 2), and axially aligned pairs of holes 46 are provided through the central flange 41 and the vertex of each side flange 42 and 43 for a roller shaft 47 to be supported by each such yoke portion. The reason for the non-cylindrical formation of the hub portions 44 and 45 is to strengthen the wheel 35 at the inner ends of these most critical yoke portions, and this also enables use of a minimum wall thickness surrounding the bore 36, with resulting minimum differences between the maximum radius of the cam follower wheel 35 and the radius of the shaft 19 to facilitate employing a shaft of maximum diameter. Peripheral tapped apertures are provided in the central flange 41 (FIG. 2) which extend radially into the shaft-receiving holes 46 therein to accommodate set screws 48 for securing the roller shafts 47 to the wheel 35.

A cam follower roller 49 is rotatably mounted by means of an anti-friction or roller bearing of known construction on each of the shafts 47, being confined between the central flange 41 and the associated side flange 42 or 43. As best seen in FIG. 1, there thus are six cam follower rollers 49 in the illustrated embodiment spaced sixty degrees apart around the wheel 35, with alternate ones disposed at opposite sides of the central flange 41 (FIG. 2) for cooperation, respectively, with the peripheral cam portions 31 and 32. The latter are so designed that one of the rollers 49 is in peripheral contact with each of them at all times (FIG. 1). It will be understood, of course, that the number of cam follower rollers 49 and the specific contours of the cam portions 31 and 32 may be varied as desired in order to drive the output shaft 19 in any selected manner. That which is necessary to attain the desired results is the above-described yoke mounting for the cam follower rollers 49.

With a cantilever mounting for the roller shafts, as in No. 2,986,949, the stresses encountered by the necessary preloading and during operations are concentrated on those end portions of the anti-friction bearings or elements next to the base point of attachment of the roller shaft. The present invention prevents the resulting excessive wear, bending of the roller shafts, development of backlash and roller bearing failures by supporting the roller shafts at both ends to distribute the stresses of preloading and operation uniformly lengthwise of the roller shafts and anti-friction elements. This also assures proper operation by maintaining the surfaces of the rollers 49 parallel with the peripheral surfaces of the cam portions 31 and 32. Thus preventing any blacklash guarantees positive accuracy of operation of the output shaft 19 and any device connected to or actuated by it. This is in sharp contrast to any type of gear drive, because all gears require running clearances and cannot function with zero-backlash.

By making the cam follower wheel 35 as a unitary investment casting, costly machinery operations, such as surface grinding of the central flange 41 and the inner faces of the side flanges 42 and 43, are eliminated. And as previously noted, the serviceability of a parallel shaft cam drive according to this invention is materially enhanced by not having to remove the mounting screws 17 to effect preload and wear-compensating adjustments and by arranging the mating surfaces 13 of the base 11 and cover 12 of the casing as disclosed to expose substantially the entire operating mechanism housed within the casing when the cover 12 is removed.

By maintaining zero-backlash to eliminate vibration and providing true relative rolling motion with no sliding surface contact, wear is practically non-existent with a parallel shaft cam drive embodying the features of this invention. The resulting extremely high efficiency is particularly important in rendering the invention useful in speed-changing devices instead of any of the usual spur or helical gearing, and the indicated advantages are of peculiar importance in machine tool operations. It also should be noted that the follower wheel of the instant invention can be used as the input or driving member, instead of the output or driven member, because of these unique advantages.

Not only are the costs of manufacturing such devices reduced and their operating efficiencies increased as noted hereinbefore, but making the cam 28 and the cam follower wheel 35 as unitary investment castings and forming the latter with the non-cylindrical portions 44 and 45 joining the flanges 41-43 to minimize the outer radius required for those flanges and enable use of a driven shaft of maximum diameter also results in minimizing the mass of the cam follower wheel. This is of material importance where, as in the illustrated embodiment, the cam follower is being driven intermittently, since inertial resistance to acceleration and deceleration will be encountered during each rotation of the driving shaft and these units operate at driving shaft speeds of as much as 5500 revolutions per minute.

I claim:

1. A parallel shaft cam drive, comprising an input shaft, a conjugate cam mounted on and rotatable by said shaft hving peripheral portions displaced relative to each other axially of said shaft and formed as a unitary investment casting, an output shaft parallel to said input shaft, cam follower rollers engaging said peripheral portions of said cam, roller shafts for individually rotatably supporting said rollers, and a cam follower wheel formed as a unitary investment casting with a bore mounted on and secured to said output shaft and having yoke portions supporting both ends of said roller shafts comprising a central flange and side flanges at both sides spaced therefrom axially of said shafts and joined by axially extending non-cylindrical portions to increase the effective thickness and strength of the wall of said bore between said flanges at the inner end of each of said yoke portions.

2. A parallel shaft cam drive according to claim 1, wherein axially aligned holes are provided through said central flange and each of said side flanges for receiving said roller shafts, and the periphery of said central flange is provided with tapped apertures extending radially into said holes, and set screws disposed in said apertures for securing said roller shafts to said cam follower wheel.

3. In a parallel shaft cam drive according to claim 1, a casing for housing said cam, wheel and rollers and having pairs of axially aligned circular apertures for receiving said input and output shafts and tapped holes spaced outwardly from and peripherally around each of said apertures, bearing caps for an aligned pair of said apertures each having a collar with an outer surface slidable into and rotatable in a said aperture, a bore eccentric to said outer surface for receiving the associated said shaft, and a peripheral flange extending outwardly from said collar with an arcuate slot therethrough registering with each associated said tapped hole, and a mounting screw extending through each said slot and into the associated said tapped hole to secure said bearing caps to said housing, whereby mere loosening of said screws permits limited rotation of said caps to adjust said shafts toward or away from each other without removing said screws from said tapped holes.

4. A parallel shaft cam drive according to claim 3, wherein said casing comprises separable parts with joining surfaces disposed adjacent said input and output shafts and each defining portions of said circular apertures and containing some of said tapped holes.

References Cited
UNITED STATES PATENTS

| 1,847,768 | 3/1932 | Kolbassief | 74—84 |
| 2,986,949 | 6/1961 | Lancaster et al. | 74—84 |

MILTON KAUFMAN, Primary Examiner